US006847860B2

(12) United States Patent
Mills et al.

(10) Patent No.: US 6,847,860 B2
(45) Date of Patent: Jan. 25, 2005

(54) PROFILER SYSTEM FOR MAIL ARTICLES

(75) Inventors: Shane F. Mills, Nichols, NY (US); Craig R. Peron, Chenango Forks, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 235 days.

(21) Appl. No.: 10/014,764

(22) Filed: Dec. 11, 2001

(65) Prior Publication Data

US 2003/0109955 A1 Jun. 12, 2003

(51) Int. Cl.[7] .................................................. G06F 7/00
(52) U.S. Cl. ........................ 700/230; 700/223; 700/324
(58) Field of Search ................................ 700/223, 224, 700/230

(56) References Cited

U.S. PATENT DOCUMENTS 2,033,645 A 3/1936 Parkhill ...................... 209/111
2,982,403 A 5/1961 Harmon ....................... 209/82
3,061,732 A 10/1962 Milnes ....................... 250/219
3,512,624 A 5/1970 Crane .......................... 198/19
3,592,326 A 7/1971 Zimmerle et al. ........ 198/33 R
3,666,093 A 5/1972 Thornton et al. ............. 209/74
4,271,967 A 6/1981 Matsuo et al. .............. 209/558
4,276,467 A 6/1981 Dubberly et al. ............. 235/92
4,360,108 A 11/1982 Logothetis .................. 209/598
4,419,384 A 12/1983 Kane et al. ................... 427/57
4,678,920 A 7/1987 Iadipaolo et al. ........... 250/560
5,020,675 A 6/1991 Cowlin et al. .............. 209/538
5,606,534 A * 2/1997 Stringer et al. ............. 367/128
5,703,784 A 12/1997 Pearson ................. 364/478.11
5,719,678 A 2/1998 Reynolds et al. ........... 356/379
5,854,679 A * 12/1998 Bourgoin et al. ........... 356/372
5,984,078 A 11/1999 Bonnet .................... 198/370.1
6,005,212 A * 12/1999 Van Lierder et al. ....... 209/586
6,023,034 A 2/2000 Nakajima et al. ........... 209/584
6,135,292 A 10/2000 Pettner ....................... 209/603
6,226,081 B1 5/2001 Fantone et al. .......... 356/239.6
6,323,452 B1 * 11/2001 Bonnet ....................... 209/583
6,616,048 B2 * 9/2003 Good et al. ............ 235/472.02

* cited by examiner

*Primary Examiner*—Donald P. Walsh
*Assistant Examiner*—Michael E Butler
(74) *Attorney, Agent, or Firm*—Perkins Smith & Cohen LLP; Jacob N. Erlich, Esq.; Peter J. Borghetti, Esq.

(57) ABSTRACT

A profiler system is preferably mounted to a conventional roller conveyor frame rail used primarily in mail handling applications. The profiler system contains an array of photo sensors strategically placed to sense the height and length of a mail tray. The sensors are operably connected to a controller that is capable of filtering false signals and accommodating varying conveyor speeds. The controller classifies the object as one of the several types of mail trays or as an unknown object based upon blocked photo sensors. The tray type is reported to a higher-level control system via an industry standard controller communication bus for further processing downstream.

11 Claims, 5 Drawing Sheets

| Tray type | | | | | | Tray Classified |
|---|---|---|---|---|---|---|
| Full MM | Half MM | Full EMM | Half EMM | Flats Tub | Unknown | |
| t(n) | t(n+1) | t(n+2) | t(n+3) | t(n+4) | t(n+5) | IGn |

FIG. 5

PROFILER SYSTEM FOR MAIL ARTICLES

STATEMENT OF GOVERNMENT INTEREST

This invention was made partially with U.S. Government support from the United States Postal Service under Contract No. 512593-00-E-1440. The U.S. Government has certain rights in the invention.

FIELD OF THE INVENTION

This invention relates generally to mail processing, and, more particularly to determining the exact profile or size characteristics of the container that contains the flat and letter mail.

BACKGROUND OF THE INVENTION

Package processing service companies, for example the USPS, process many different types of articles in their facilities. After local (in plant) processing (sorting), the mail needs to be routed to its next destination. Routing the mail to its next destination usually entails at least over the road travel, but usually a more common occurrence requires a combination of air and over the road shipping. Due to the competitive nature of the shipping industry, time is of the essence. The time critical nature of mail delivery is one of the most important factors the USPS and its competitors face other than delivery accuracy. After the flats and letter sortation processing occurs, the aggregate mail trays need to be dispatched to their next destination with speed and accuracy. The USPS uses over the road containers to ship bulk amounts of mail. These over the road containers are designed to handle certain types of mail trays. Due to this fact, mail streams need to be separated for efficient processing. A divert action needs to be made upstream of the dispatch conveyor system in order to process flats tubs in one mail stream and all other letter trays in another mail stream. In order to make this divert action, a divert decision needs to be made based on information and characteristics of the mail stream gathered by the mail article profiler. The type of article needs to be determined to correctly divert it in the mail stream for efficient processing.

In the past, this type of mail processing was done manually by human intervention, or by extra conveyor lines in order to keep the mail streams separate, making the task expensive, labor intensive and overall inefficient.

SUMMARY OF THE INVENTION

The present invention is in the form of a profiler system mounted to the conventional roller conveyor frame rail used in object handling applications and, in particular mail handling applications. The present invention contains an array of conventional photo sensors strategically placed to sense the height and length of a mail tray. The photo sensors generate signals that are recognized by a controller, which has the ability to filter false signals and accommodate varying conveyor speeds. Based upon the length of time that individual and combination of photo sensors in the array are blocked, the controller classifies the object as one of numerous types of known objects, such as mail trays, or unknown objects. The tray type is reported to a higher-level control system via an industry standard controller communication bus, which are outside the scope of the present invention.

More specifically, the profiler of this invention includes photo sensors, a controller, a power supply, and system software. The present invention utilizes photo sensors in very specific areas as well as a controller to process data in order to make an accurate decision for further processing. The photo sensors are positioned in such a way that when a tray of mail comes through the system a "snap-shot" of the data is taken. This "snap shot" takes place as photo sensors mounted in the conveyor are blocked and unblocked by a passing mail tray. The data is then compared to a "look-up table" or matrix of photo sensors vs., for example, mail tray type and the decision is made for conveyor diversion. System software polls the sensors, filters and debounces data streams for more reliable results.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 5 is an example of a bit map developed in accordance with this invention to track the sensors blocked by an object as it is transported through the conveyor system.

DETAILED DESCRIPTION OF THE PREFERRED EMBODIMENTS

The present invention is now described more fully hereinafter with reference to the accompanying drawings, in which the preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
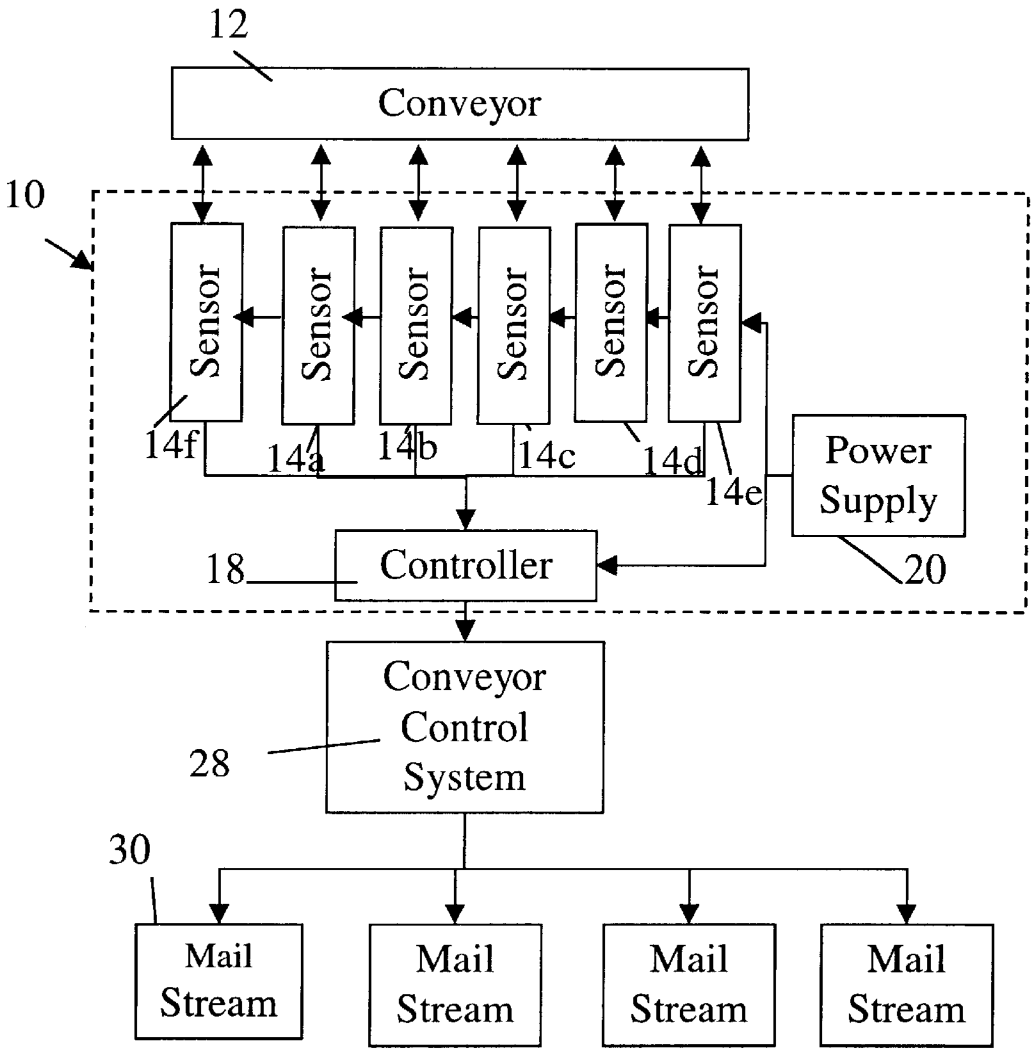
FIG. 1 is a block diagram of the present invention adapted to a conventional roller conveyor.
Figure 2:
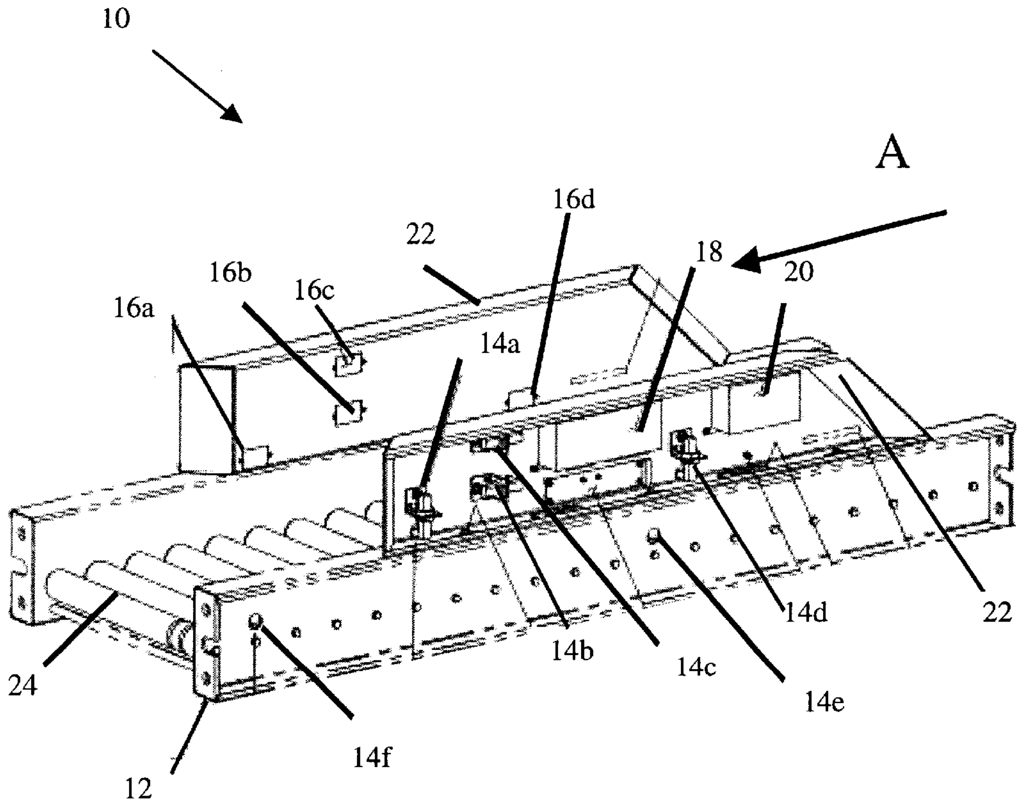
FIG. 2 is a pictorial representation of the profiler of the present invention in conjunction with an existing conveyor control system and conveyor.

The preferred embodiment of the above invention provides a profiler or profiler system, being generally indicated by numerical designation 10, illustrated in the accompanying drawings, which preferably is adapted to a conventional conveyor control system and conveyor for diverting various sized mail trays or other objects to specific mail streams within the conveyor system, which are outside the scope of the present invention. As illustrated in FIGS. 1 and 2, the system 10 generally includes a plurality of sensors, preferably four sensors 14*a*, 14*b*, 14*c*, 14*d* (interchangeably referred to herein as photo sensors and photo eyes) operably connected to a controller 18 and a power supply 20. The preferred embodiment sensors include photo eyes, such as Cutler Hammer 14156RDP17B1, Banner, Honeywell or any other manufacturers equivalent photo-eyes, with accompanying reflectors 16*a*, 16*b*, 16*c*, and 16*d* shown in FIG. 2. The preferred embodiment is shown mounted on the side rails 22 of a conventional roller conveyor 12, as illustrated in FIG. 2. Additionally, there are photo eyes positioned at the conveyor entrance 14*e* and exit 14*f* (interchangeably referred to herein as photo sensors 14*e* and 14*f*, photo eyes 14*e* and 14*f*, and entrance photo sensor (or eye) 14*e* and exit photo sensor (eye) 14*f*), with corresponding reflectors (not shown).

As shown in FIG. 2, the photo eyes 14*a*, 14*b*, 14*c*, 14*d* can be arranged in any height above the conveyor surface 24 and at any distance along the conveyor rails 22 to accommodate all types of mail trays. The various types of mail trays used in this example to transport mail are up to 13.0" in width and 26" in length, with a maximum height of 8.5" including combined height of mail and tray. Therefore, 9" is used as the minimum container clearance height. For illustration purposes, the following trays are used in the preferred embodiment: full MM trays (25.5" long×12.38" wide×5" high), half MM trays (13.75" long×12.13" wide×5" high), full EMM trays (24.5" long×13" wide×6.25" high), half EMM trays (12.25" long×13" wide×6.25" high), and flats tub (8.25" long×13.25" wide×11.5" high). Additional trays may be added with the placement of photo eyes to recognize their presence. It should be further noted that this invention is not limited to mail trays but can also find applicability with any other type of objects that have to be sorted according to size.

Figure 3:
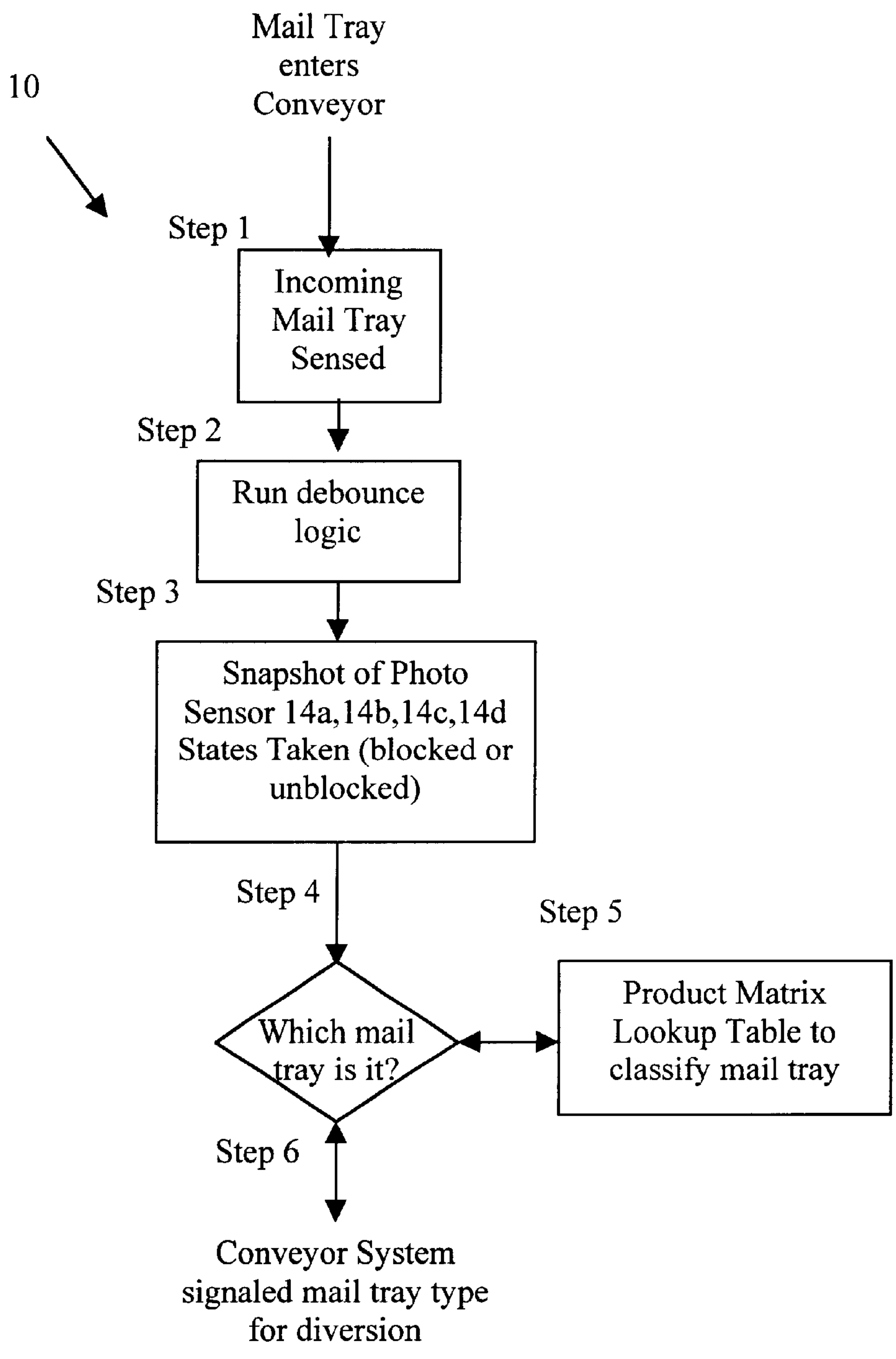
FIG. 3 is a flow chart of the process for profiling an article according to the present invention.

FIGS. 2 and 3 illustrate the profiler system and the process for handling an object, for this example a mail tray (not shown), being profiled for a future action, for this example downstream diversion of the mail tray. The process is initiated when the mail tray entering the conveyor 12 in the direction of arrow "A" and travels down the roller 24. The first step of the process is sensing the mail tray by photo sensor 14*e* that activates or wakes the sleeping controller 18 to run conventional "debounce" logic, step 2, to check for false positives.

The controller 18 is programmed to filter false signals and accommodate varying conveyor speeds. Standard photo-sensor debounce logic, used in the preferred embodiment, is set, for example, at 150 msec (~5.5" of travel @ 180 fpm) to prevent false positives due to mail sticking out of the top of the tray, dust or any other miscellaneous articles that may come into contact with the conveyor or profiler. Debounce logic (not disclosed) is designed into the controller 18 software to limit the number of false readings that would ultimately affect the overall accuracy and performance of the profiler system. Debounce logic provides a time delay (for example 150 msec) between the time an object is sensed by the photo sensor 14*a* and when the controller 18 recognizes the "on" signal that the photo-eye is sending, thereby increasing overall system reliability.

Figure 4:
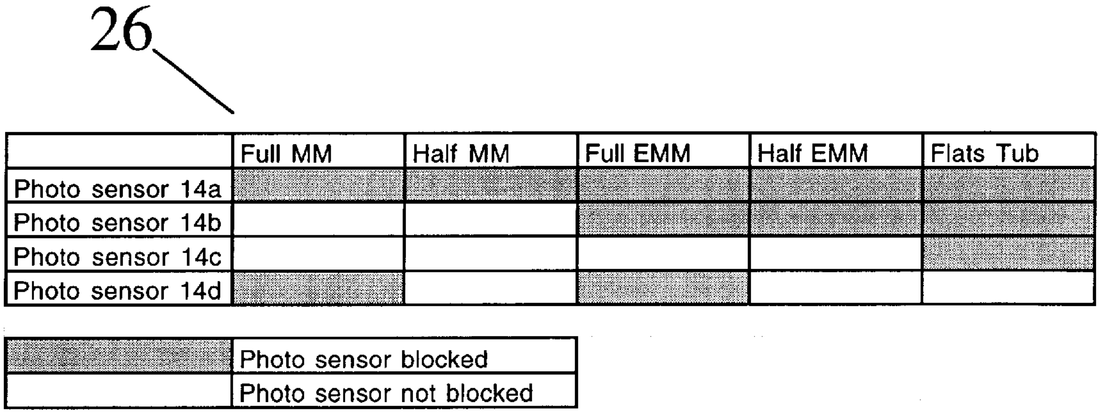
FIG. 4 is a table of a photo sensor list of blocked and unblocked photo sensors in accordance with this invention.

The third, fourth and fifth steps of the process occurs when the leading edge of a mail tray reaches photo sensor 14*a*. In step 3, the states (blocked or not blocked) of photo sensor 14*a*, 14*b*, 14*c*, and 14*d* are sensed to determine the tray type as per a photo sensor matrix 26, as illustrated in FIG. 4. Due to tray lengths and photo sensor placement of the preferred embodiment, the photo sensor states are valid for up to 5.75" of tray travel after photo sensor 14*a* is blocked by the leading edge of a tray.

At steps 4 and 5, the tray is classified by setting a "Tray Type" bit, as illustrated in FIG. 5. This operation occurs approximately 150 msec (~5.5" of travel @180 fpm based on the debounce logic) after the leading edge of the tray passes photo sensor 14*a*. Concurrently, a global "Tray Classified" bit is broadcast as a request for the controller 18 to poll for the tray type. When the tray arrives at the exit photo sensor 14*f* of the conveyor 12, the tray type bits are reset to zero.

Now returning to FIG. 4, the controller 18 compares the photo sensor states to the photo sensor matrix 26 to identify the tray type. The controller 18 then forwards, step 6, the tray type information to the conveyor control system 28 for determining which mail stream 30 to diverge the tray downstream, as illustrated in FIG. 1.

Any combinations of photo sensor blocked v. not blocked which are not covered by the photo sensor matrix 26 are classified as unknown trays and diverted to a special handling area downstream. For example, when all sensors are blocked, the tray may be too long and too high for the downstream distribution stations to accommodate. Another situation may arise that sensors 14*a*, 14*b*, 14*c*, and 14*d* are not blocked when a tray passes sensor 14*f*, indicating that a tray is shorter than accepted and its length is unknown. In these and similar cases, the controller 18 will signal the conveyor control system 28 that an unknown tray has exited the conveyor. The conveyor control system 28, in response to the signal by the controller 18, will divert the unknown tray downstream to a holding area.

Although the invention has been described with respect to various embodiments, it should be realized this invention is also capable of a wide variety of further and other embodiments within the spirit and scope of the appended claims.

What is claimed is:

1. An object handling system for use in conjunction with a conveyor system comprising:

first means for sensing an object having a leading edge that is being transported along the conveyor system, wherein said first means senses a height and a length of the object; and second means for analyzing the height and the length of the object to classify the object as a type, said second means being operably connected to said first means, wherein said object is a mail tray.

2. The system as defined in claim 1, wherein said first means includes a plurality of sensors positioned relative to each other such that the object height and the object length can be measured, wherein said plurality of sensors includes a first and a last sensor, wherein each of said plurality of sensors generate a signal to said second means when said last sensor of said plurality of sensors senses the leading edge of the object.

3. The system as defined in claim 2, wherein said second means processes said signal of said each of said plurality of sensors to create a profile of the object.

4. The system as defined in claim 3, wherein said second means compares said profile to a standard, wherein said standard comprises an array of types.

5. The system as defined in claim 1, wherein said second means assigns said type to the object.

6. The system as defined in claim 1, further comprising third means for communicating said type to the conveyor system for further processing, wherein said third means being operably connected to said second means.

7. The system as defined in claim 1, wherein said second means comprises a controller.

8. The system as defined in claim 1, wherein said plurality of sensors includes at least two pairs of photo eyes and reflectors.

9. The system as defined in claim 1, further comprising logic means for filtering false signals.

10. A method of handling an object transported by a conveyor comprising the steps of:

sensing information of an object as it is transported along the conveyor;

comparing the sensed information of the object with a standard, wherein the standard comprises an array of object types;

assigning an object type to the object; and communicating the object type to the conveyor for handling of the object, wherein the object is a mail tray.

11. A method as defined in claim 10, further comprising the step of filtering false signals.

* * * * *

UNITED STATES PATENT AND TRADEMARK OFFICE

CERTIFICATE OF CORRECTION

PATENT NO. : 6,847,860 B2
DATED : January 25, 2005
INVENTOR(S) : Mills et al.

It is certified that error appears in the above-identified patent and that said Letters Patent is hereby corrected as shown below:

Column 4,
Line 4, "accepted" should read -- expected --.

Signed and Sealed this

Fifth Day of April, 2005

JON W. DUDAS
*Director of the United States Patent and Trademark Office*